(12) United States Patent
Nakagawa

(10) Patent No.: US 10,276,889 B2
(45) Date of Patent: Apr. 30, 2019

(54) LITHIUM ION SECONDARY BATTERY

(71) Applicant: Automotive Energy Supply Corporation, Zama-Shi, Kanagawa (JP)

(72) Inventor: Takashi Nakagawa, Zama (JP)

(73) Assignee: AUTOMOTIVE ENERGY SUPPLY CORPORATION, Kanagawa (JP)

( * ) Notice: Subject to any disclaimer, the term of this patent is extended or adjusted under 35 U.S.C. 154(b) by 0 days.

(21) Appl. No.: 15/175,132

(22) Filed: Jun. 7, 2016

(65) Prior Publication Data

US 2017/0005363 A1  Jan. 5, 2017

(30) Foreign Application Priority Data

Jun. 30, 2015  (JP) ................................. 2015-131994

(51) Int. Cl.
*H01M 10/0525* (2010.01)
*H01M 10/0567* (2010.01)
(Continued)

(52) U.S. Cl.
CPC ....... *H01M 10/0525* (2013.01); *H01M 4/364* (2013.01); *H01M 4/505* (2013.01);
(Continued)

(58) Field of Classification Search
CPC ........... H01M 10/0418; H01M 10/044; H01M 10/0525; H01M 10/0567; H01M 2220/20;
(Continued)

(56) References Cited

U.S. PATENT DOCUMENTS

2001/0010807 A1* 8/2001 Matsubara ............. C01G 53/50
423/277
2007/0089289 A1* 4/2007 Issaev ..................... H01M 4/04
29/623.1
(Continued)

FOREIGN PATENT DOCUMENTS

CN       101297424 A    10/2008
JP       H11283667 A    10/1999
(Continued)

OTHER PUBLICATIONS

M. Lengyel, X. Zhang, G. Atlas, H.L. Bretscher, I. Belharouak, R.L. Axelbaum. Composition Optimization of Layered Lithium Nickel Manganese Cobalt Oxide Materials Synthesized via Ultrasonic Spray Pyrolysis, Journal of The Electrochemical Society, 161 (9) A1338-A1349 (2014).*

(Continued)

*Primary Examiner* — Carlos Barcena
(74) *Attorney, Agent, or Firm* — Troutman Sanders LLP

(57) ABSTRACT

Provided is a lithium ion secondary battery including: a positive electrode having a positive electrode active material layer disposed on a positive electrode current collector; a negative electrode having a negative electrode active material layer disposed on a negative electrode current collector; and an electrolyte solution. The positive electrode active material layer includes a positive electrode active material containing a lithium nickel composite oxide. The positive electrode contains an alkaline component by less than 1% relative to a weight of the positive electrode active material. The electrolyte solution includes an additive containing a cyclic carbonate additive with an unsaturated bond. A molar ratio of the cyclic carbonate additive with an unsaturated bond relative to a total molar amount of the additive is 78% or less.

9 Claims, 1 Drawing Sheet

(51) Int. Cl.
*H01M 4/505* (2010.01)
*H01M 4/525* (2010.01)
*H01M 4/36* (2006.01)
*H01M 2/16* (2006.01)
*H01M 4/04* (2006.01)
*H01M 4/131* (2010.01)
*H01M 4/1391* (2010.01)
*H01M 10/04* (2006.01)

(52) U.S. Cl.
CPC ....... *H01M 4/525* (2013.01); *H01M 10/0567* (2013.01); *H01M 2/1686* (2013.01); *H01M 4/0404* (2013.01); *H01M 4/131* (2013.01); *H01M 4/1391* (2013.01); *H01M 10/044* (2013.01); *H01M 10/0418* (2013.01); *H01M 2220/20* (2013.01); *H01M 2300/004* (2013.01); *H01M 2300/0025* (2013.01); *Y02T 10/7011* (2013.01)

(58) Field of Classification Search
CPC ... H01M 2300/0025; H01M 2300/004; H01M 2/1686; H01M 4/0404; H01M 4/131; H01M 4/1391; H01M 4/364; H01M 4/505; H01M 4/525
See application file for complete search history.

(56) References Cited

U.S. PATENT DOCUMENTS

| | | | |
|---|---|---|---|
| 2011/0076558 A1 | 3/2011 | Miyazaki et al. | |
| 2011/0281168 A1* | 11/2011 | Watanabe | H01M 4/525 429/223 |
| 2012/0161069 A1* | 6/2012 | Nagai | H01M 4/505 252/182.1 |
| 2012/0292561 A1 | 11/2012 | Sasaoka et al. | |
| 2012/0321948 A1* | 12/2012 | Oya | H01M 4/0404 429/211 |
| 2015/0147655 A1 | 5/2015 | Park et al. | |
| 2016/0197339 A1* | 7/2016 | Tanjo | H01M 4/62 429/217 |

FOREIGN PATENT DOCUMENTS

| | | | |
|---|---|---|---|
| JP | 2001-297764 A | 10/2001 | |
| JP | 2005-203342 A | 7/2005 | |
| JP | 2010-238387 A | 10/2010 | |
| JP | 2014-049390 A | 3/2014 | |
| WO | 2007049215 A1 | 5/2007 | |
| WO | 2011-089958 A1 | 7/2011 | |
| WO | WO-2014098037 A1 * | 6/2014 | .............. H01M 4/62 |

OTHER PUBLICATIONS

D.Y. Wang, J. Xia, L. Ma, K.J. Nelson, J.E. Harlow, D. Xiong, L.E. Downie, R. Petibon, J.C. Burns, A. Xiao, W.M. Lamanna, J.R. Dahna. A Systematic Study of Electrolyte Additives in Li[Ni1/3Mn1/3Co1/3]O2 (NMC)/Graphite Pouch Cells, Journal of The Electrochemical Society, 161 (12) A1818-A1827 (2014).*
Extended European Search Report dated Aug. 2, 2016 for the corresponding European Patent Application No. 16173067.6.
J. Xia et al: "Comparative Study on Methylene Methyl Disulfonate (MMDS) and 1, 3-Propane Sultone (PS) as Electrolyte Additives for Li-Ion Batteries", Journal of the Electrochemical Society, vol. 161, No. 4, Feb. 12, 2014 (Feb. 12, 2014), pp. A547-A553, XP055286352, ISSN: 0013-4651, DOI: 10.1149/2.049404jes.
Communication pursuant to Article 94(d) EPC for EP Patent Application No. 16173067.6 dated Aug. 17, 2017.
H.S. Liu et al., "Origin of Deterioration for LiNiO2 Cathode Material during Storage in Air," Electrochemical and Solid-State Letters, 2004 vol. 7, issue 7, A190-A193.
Jisuk Kim et al., "Washing Effect of a LiNi0,83Co0,15Al0.02O2 Cathode in Water," Electrochemical and Solid-State Letters, 9(1) A19-A23 (2006).
Lin Ma, et al, "Ternary and Quaternary Electrolyte Additive Mixtures for Li-Ion Cells That Promote Long Lifetime, High Discharge Rate and Better Safety", Journal of The Electrochemical Society, 161 (9) A1261-A1265 (2014).

* cited by examiner

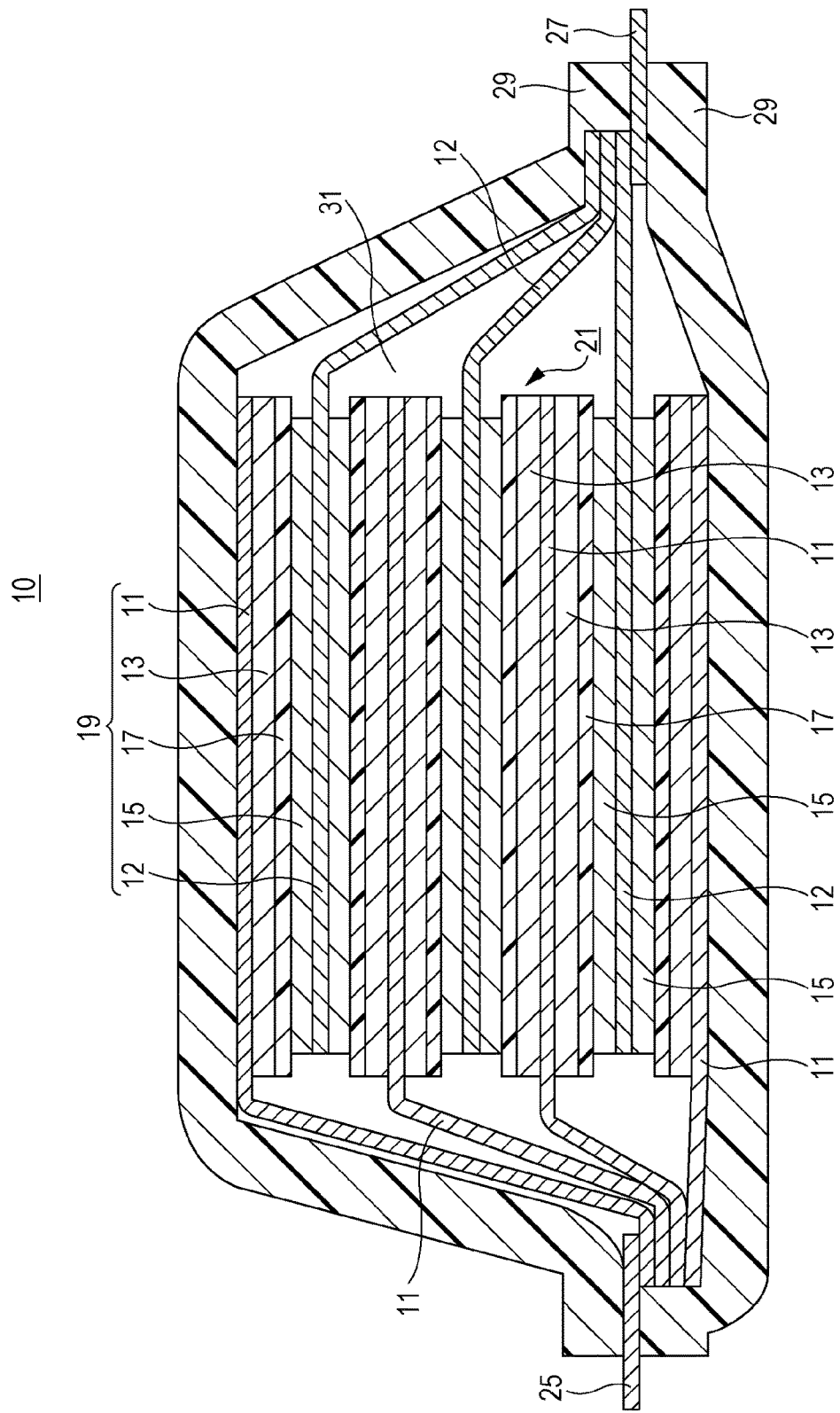

LITHIUM ION SECONDARY BATTERY

CROSS-REFERENCE TO RELATED APPLICATION

This application claims priority from Japanese Patent Application No. 2015-131994 filed with the Japan Patent Office on Jun. 30, 2015, the entire content of which is hereby incorporated by reference.

BACKGROUND

1. Technical Field

The present disclosure relates to nonaqueous electrolyte batteries, particularly to lithium ion secondary batteries.

2. Related Art

Nonaqueous electrolyte batteries have been put into practical use as batteries for vehicles including hybrid vehicles and electric vehicles. Lithium ion secondary batteries have been used as such on-vehicle batteries. Lithium ion secondary batteries have been required to have various characteristics: output characteristic, energy density, capacity, lifetime, and high-temperature stability. In particular, various improvements for the electrolyte solution have been attempted in order to enhance the battery life (cycle characteristic and preservation characteristic).

For example, JP-A-11-283667 has suggested the battery including the electrolyte solution containing propylene carbonate and vinylene carbonate. This electrolyte solution is employed for the purpose of preventing the crystal structure of the lithium manganate composite oxide contained in the positive electrode active material from being destroyed when the battery is preserved under high temperature. In the example according to JP-A-11-283667, the lithium manganese composite oxide is used as the positive electrode active material and the nonaqueous electrolyte solution containing propylene carbonate (or ethylene carbonate), vinylene carbonate, and diethyl carbonate is used as the electrolyte solution. From the viewpoint of improving the cycle lifetime, for example, using a lithium nickel composite oxide as the positive electrode active material has been attempted.

SUMMARY

A lithium ion secondary battery according to an embodiment of the present disclosure includes: a positive electrode having a positive electrode active material layer disposed on a positive electrode current collector; a negative electrode having a negative electrode active material layer disposed on a negative electrode current collector; and an electrolyte solution. The positive electrode active material layer includes a positive electrode active material containing a lithium nickel composite oxide. The positive electrode contains an alkaline component by less than 1% relative to a weight of the positive electrode active material. The electrolyte solution includes an additive containing a cyclic carbonate additive with an unsaturated bond. A molar ratio of the cyclic carbonate additive with an unsaturated bond relative to a total molar amount of the additive is 78% or less.

BRIEF DESCRIPTION OF THE DRAWINGS

The drawing is a schematic sectional view illustrating a lithium ion secondary battery according to one embodiment of the present disclosure.

DETAILED DESCRIPTION

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

For the battery including the positive electrode active material containing a lithium nickel composite oxide, the electrolyte solution containing cyclic carbonate with an unsaturated bond, such as vinylene carbonate, as the additive may be used. In this case, a problem of the generation of gas mainly containing carbon dioxide ($CO_2$) occurs. The generation of such gas is considered to be derived from the manufacturing process, specifically from the reaction between the additive and the alkaline substance such as lithium carbonate ($Li_2CO_3$) and lithium hydroxide (LiOH) remaining in the lithium nickel composite oxide. The generation of the gas in the battery causes the battery to swell, so that the battery has lower capacity retention and the battery performance may therefore deteriorate. In view of this, an objective of the present disclosure is to provide a lithium ion secondary battery including a lithium nickel composite oxide as the positive electrode active material, of which gas generation from the electrolyte solution is suppressed to enable the battery to have higher discharge capacity retention (improved cycle characteristic and preservation life).

A lithium ion secondary battery according to an embodiment of the present disclosure includes: a positive electrode having a positive electrode active material layer disposed on a positive electrode current collector; a negative electrode having a negative electrode active material layer disposed on a negative electrode current collector; and an electrolyte solution. The positive electrode active material layer includes a positive electrode active material containing a lithium nickel composite oxide. The positive electrode contains an alkaline component by less than 1% relative to a weight of the positive electrode active material. The electrolyte solution includes an additive containing a cyclic carbonate additive with an unsaturated bond. A molar ratio of the cyclic carbonate additive with an unsaturated bond relative to a total molar amount of the additive is 78% or less.

According to the lithium ion secondary battery of the present disclosure, the gas generation from the electrolyte solution is remarkably reduced and the discharge capacity retention of the battery is improved.

An embodiment of the present disclosure will be described below. A positive electrode in this embodiment is a battery member with a shape like a thin plate or a sheet. This member includes a positive electrode active material layer formed by applying or rolling a mixture, which includes a positive electrode active material, binder, and if necessary a conductive agent, on a positive electrode current collector such as a metal foil and then drying the mixture. A negative electrode in this embodiment is a battery member with a shape like a thin plate or a sheet. This member includes a negative electrode active material layer formed by applying a mixture, which includes a negative electrode active material, binder, and if necessary a conductive agent, on a negative electrode current collector. The separator is a film-shaped battery member. This member separates between the positive electrode and the negative electrode to secure the conduction of lithium ions between the positive electrode and the negative electrode. The electrolyte solution is an electrically conductive solution obtained by dissolving an ionic substance in a solvent. In this embodiment, particularly a nonaqueous electrolyte solution can be used. The power generating element including the positive electrode, the negative electrode, and the separator constitutes one unit of the battery main components. In general, this power generating element is a stack having the positive electrode and the negative electrode overlapped (stacked) on each other with the separator interposed therebetween. In the lithium ion secondary battery according to the embodiment of the present disclosure, this stack is immersed in the electrolyte solution.

The lithium ion secondary battery according to the embodiment includes the package and the power generating element housed inside the package. Preferably, the power generating element is housed inside the sealed package. Here, "sealed" refers to the state that the power generating element is covered with the package material so that the power generating element is not exposed to the external air. That is to say, the package has a sealable bag-like shape that can house the power generating element inside.

Here, the positive electrode active material layer preferably includes the positive electrode active material containing a lithium nickel composite oxide. The lithium nickel composite oxide refers to a metal composite oxide containing lithium and nickel, which is represented by general formula $Li_xNi_yMe_{(1-y)}O_2$ (where Me represents at least one kind of metal selected from the group consisting of Al, Mn, Na, Fe, Co, Cr, Cu, Zn, Ca, K, Mg, and Pb).

In this embodiment, the positive electrode active material layer preferably includes the positive electrode active material containing a lithium nickel manganese cobalt composite oxide. The lithium nickel manganese cobalt composite oxide is represented by general formula $Li_xNi_yCo_zMn_{(1-y-z)}O_2$ and has a layered crystal structure. In the general formula, "x" satisfies the relation of $1 \leq x \leq 1.2$, y and z are positive numerals satisfying the relation of $y+z<1$, and y is a numeral of 0.5 or less. Containing more manganese makes it difficult to form a composite oxide with a single phase. In view of this, the relation of $1-y-z \leq 0.4$ is desirably satisfied. Containing more cobalt results in cost increase and capacity decrease. In view of this, the relations of $z<y$ and $z<1-y-z$ are desirably satisfied. From the viewpoint of achieving the battery with higher capacity, it is particularly preferable that the relations of $y>1-y-z$ and $y>z$ are satisfied.

The positive electrode includes an alkaline component by less than 1% relative to the weight of the positive electrode active material. The alkaline component is an alkaline substance that is derived from the manufacturing process of the positive electrode active material and that can be contained in the positive electrode active material. Examples of the alkaline component include metal hydroxide and metal carbonate. More specific examples thereof include LiOH, $LiOH \cdot H_2O$, $Li_2CO_3$, $Ni(OH)_2$, and $NiCO_3$ used as the material when the lithium nickel composite oxide is manufactured, and $Co(OH)_2$, $CoCO_3$, $Mn(OH)_2$, and $MnCO_3$ used as the material when the lithium nickel cobalt manganese composite oxide is manufactured. These alkaline components are the material for the transition metal composite oxide used as the positive electrode active material. For this reason, the remaining of these components in the positive electrode active material is unavoidable. The remaining components, however, can be reduced by, for example, adjusting the burning temperature, the burning time, or the burning atmosphere, adjusting the amount of alkaline component to be used, selecting the material kind, adjusting the Li/Me (metal) ratio, or adding a process of removing impurities. Thus, the positive electrode preferably contains the alkaline component by less than 1%, more preferably 0.2% or less, relative to the weight of the positive electrode active material.

A preferred example of the electrolyte solution to be used in the present embodiment is a nonaqueous electrolyte solution, and example thereof is a mixture including a linear carbonate and a cyclic carbonate. Examples of the linear carbonate include dimethyl carbonate (hereinafter referred to as "DMC"), diethyl carbonate (hereinafter referred to as "DEC"), di-n-propyl carbonate, di-t-propyl carbonate, di-n-butyl carbonate, di-isobutyl carbonate, and di-t-butyl carbonate. Examples of the cyclic carbonate include propylene carbonate (hereinafter referred to as "PC") and ethylene carbonate (hereinafter referred to as "EC"). The electrolyte solution is obtained by dissolving a lithium salt such as lithium hexafluorophosphate ($LiPF_6$), lithium tetrafluoroborate ($LiBF_4$), or lithium perchlorate ($LiClO_4$) in such a carbonate mixture.

The electrolyte solution may contain additives in addition to the above components. Examples of the additives that can be added to the electrolyte solution in the embodiment include an additive containing sulfur, a cyclic carbonate additive with an unsaturated bond, and a cyclic carbonate additive with a halogen. The additive containing sulfur is decomposed electrochemically in the process of charging and discharging the battery to form a film on a surface of the electrode used in the embodiments to be described below. This stabilizes the structure of the electrode. Examples of such an additive include cyclic sulfonates including sultones and cyclic disulfonates such as methylene methanedisulfonate (MMDS), ethylene methanedisulfonate, and propylene methanedisulfonate, and linear sulfonate such as methylenebis(benzenesulfonate), methylenebis(phenylmethanesulfonate), and methylenebis(ethanesulfonate).

The cyclic carbonate additive with an unsaturated bond forms a protective film for the positive electrode and the negative electrode in the process of charging and discharging the battery. In particular, the attack from the additive containing sulfur to the positive electrode active material containing the lithium nickel composite oxide can be prevented. Examples of the cyclic carbonate additive with an unsaturated bond include vinylene carbonate, vinyl ethylene carbonate, propylene carbonate methacrylate, and propylene carbonate acrylate. A particularly preferable example of the cyclic carbonate additive with an unsaturated bond is vinylene carbonate (hereinafter referred to as "VC").

The cyclic carbonate additive with a halogen forms a protective film for the positive electrode and the negative electrode in the process of charging and discharging the battery. In particular, the attack from the additive containing sulfur to the positive electrode active material containing the lithium nickel composite oxide can be prevented. Examples of the cyclic carbonate additive with a halogen include fluoroethylene carbonate, difluoroethylene carbonate, trifluoroethylene carbonate, chloroethylene carbonate, dichloroethylene carbonate, and trichloroethylene carbonate. A particularly preferable example of the cyclic carbonate additive with a halogen is fluoroethylene carbonate.

In the preparation of the electrolyte solution, the additives are added by 20 wt % or less, preferably 15 wt % or less, and more preferably 10 wt % or less relative to the weight of the entire electrolyte solution. In this embodiment, the molar ratio of the cyclic carbonate additive with an unsaturated bond is preferably 78% or less, particularly preferably 63% or less, relative to the total molar amount of the additives.

The negative electrode that can be used in any embodiment includes a negative electrode active material layer including a negative electrode active material disposed on a negative electrode current collector. Preferably, the negative electrode includes the negative electrode active material layer obtained by applying or rolling a mixture, which includes the negative electrode active material, binder, and a conductive agent added as necessary, onto the negative electrode current collector including a metal foil such as a copper foil, and then drying the mixture. In each embodiment, the negative electrode active material preferably includes graphite particles and/or amorphous carbon particles. If a mixed carbon material including both graphite particles and amorphous carbon particles is used, the regeneration performance of the battery is improved.

Graphite is a hexagonal crystal carbon material having the hexagonal-plate-like crystal structure. Graphite is also called black lead or the like. The preferred shape of the graphite is particle. Amorphous carbon may have a structure partly similar to graphite. Amorphous carbon refers to a carbon material that is amorphous as a whole, having a microcrystalline structure forming a network randomly. Examples of the amorphous carbon include carbon black, cokes, activated carbon, carbon fiber, hard carbon, soft carbon, and mesoporous carbon. The preferred shape of the amorphous carbon is particle.

Examples of the conductive agent used as necessary for the negative electrode active material layer include carbon materials, for example, carbon fiber such as carbon nanofiber, carbon blacks such as acetylene black and Ketjen black, activated carbon, mesoporous carbon, fullerenes, and carbon nanotube. Additionally, the negative electrode active material layer may contain additives usually used for forming the electrode, such as thickener, dispersant, and stabilizer.

Examples of the binder used for the negative electrode active material layer include: fluorine resins such as polyvinylidene fluoride (PVDF), polytetrafluoroethylene (PTFE), and polyvinyl fluoride (PVF); conductive polymers such as polyanilines, polythiophenes, polyacetylenes, and polypyrroles; synthetic rubber such as styrene butadiene rubber (SBR), butadiene rubber (BR), chloroprene rubber (CR), isoprene rubber (IR), and acrylonitrile butadiene rubber (NBR); and polysaccharides such as carboxymethyl cellulose (CMC), xanthan gum, guar gum, and pectin.

The positive electrode that can be used in any embodiment includes the positive electrode active material layer including a positive electrode active material disposed on a positive electrode current collector. Preferably, the positive electrode includes the positive electrode active material layer obtained by applying or rolling a mixture, which includes the positive electrode active material, binder, and a conductive agent added as necessary, onto the positive electrode current collector including a metal foil such as an aluminum foil, and then drying the mixture.

Examples of the conductive agent that may be used for the positive electrode active material layer include carbon materials, for example, carbon fiber such as carbon nanofiber, carbon blacks such as acetylene black and Ketjen black, activated carbon, graphite, mesoporous carbon, fullerenes, and carbon nanotube. In addition, the positive electrode active material layer may contain additives that are usually used for forming the electrode, such as thickener, dispersant, and stabilizer.

Examples of the binder used for the positive electrode active material layer include: fluorine resins such as polyvinylidene fluoride (PVDF), polytetrafluoroethylene (PTFE), and polyvinyl fluoride (PVF); conductive polymers such as polyanilines, polythiophenes, polyacetylenes, and polypyrroles; synthetic rubber such as styrene butadiene rubber (SBR), butadiene rubber (BR), chloroprene rubber (CR), isoprene rubber (IR), and acrylonitrile butadiene rubber (NBR); and polysaccharides such as carboxymethyl cellulose (CMC), xanthan gum, guar gum, and pectin.

In this embodiment, water is contained preferably by 400 ppm or less relative to the weight of the lithium nickel composite oxide in the positive electrode active material. The water that can be contained in the positive electrode active material possibly promotes the gas generation from the additive in the electrolyte solution. In view of this, it is desirable that the moisture is reduced as much as possible. However, while the positive electrode active material is treated or in the process of manufacturing the positive electrode, the mixing of water into the positive electrode active material is unavoidable in the unintended situation. Even if the water is mixed, however, the effect of promoting the gas generation can be suppressed as long as the water is contained by as low as 400 ppm relative to the weight of the lithium nickel composite oxide.

The separator to be used in any embodiment includes an olefin resin layer. The olefin resin layer is a layer containing polyolefin obtained by polymerizing or co-polymerizing α-olefin. Examples of such α-olefin include ethylene, propylene, butene, pentene, and hexene. In the embodiment, the olefin resin layer is preferably a layer with a structure having pores closed when the battery temperature has increased, i.e., porous or microporous polyolefin. With the olefin resin layer having such a structure, the separator is closed (shutdown) upon the increase in battery temperature, thereby stopping the ion flow. In order to achieve the shutdown effect, it is particularly preferable to use the porous polyethylene film. The separator may include a heat-resistant microparticle layer. With the heat-resistant microparticle layer, the stop of the battery function by the heat generation from the battery can be prevented. The heat-resistant microparticle layer includes a stable inorganic microparticle with heat resistance that resists a temperature of 150° C. or higher and uneasily reacts electrochemically. Examples of such a heat-resistant inorganic microparticle include inorganic oxide such as silica, alumina (α-alumina, β-alumina, and θ-alumina), iron oxide, titanium oxide, barium titanate, and zirconium oxide, and minerals such as boehmite, zeolite, apatite, kaolin, spinel, mica, and mullite. The separator including the heat-resistant resin layer is generally referred to as "ceramic separator".

Here, a structure example of the lithium ion secondary battery according to the embodiment is described with reference to the drawing. The drawing illustrates an example of a cross section of the lithium ion secondary battery. A lithium ion secondary battery 10 includes, as main components, a negative electrode current collector 11, a negative electrode active material layer 13, a separator 17, a positive electrode current collector 12, and a positive electrode active material layer 15. In the drawing, the negative electrode active material layer 13 is provided on each surface of the negative electrode current collector 11. The positive electrode active material layer 15 is provided on each surface of the positive electrode current collector 12. Note that the active material layer may alternatively be formed on only one surface of each current collector. The negative electrode current collector 11, the positive electrode current collectorb 12, the negative electrode active material layer 13, the positive electrode active material layer 15, and the separator 17 constitute one battery unit, i.e., a power generating element (unit cell 19 in the drawing). A plurality of unit cells 19 is stacked with the separator 17 interposed therebetween. Extension portions extending from the negative electrode current collectors 11 are collected and bonded onto a negative electrode lead 25. Extension portions extending from the positive electrode current collectors 12 are collected and bonded onto a positive electrode lead 27. The positive electrode lead is preferably an aluminum plate and the negative electrode lead is preferably a copper plate. In some cases, the positive electrode lead and the negative electrode lead may be partly coated with another metal (such as nickel, tin, or solder) or a polymer material. The positive electrode lead and the negative electrode lead are welded to the positive electrode and the negative electrode, respectively. The battery including the stacked unit cells is covered with a package 29 with the welded negative electrode lead 25 and positive electrode lead 27 led out of the battery. An electrolyte solution 31 is poured into the package 29. The package 29 has a shape obtained by heat-sealing the periphery of the two stacks.

EXAMPLES

<Manufacture of Negative Electrode: Examples and Comparative Examples>

Graphite powder with a BET specific surface area of 3.4 m$^2$/g was used as the negative electrode active material. This graphite powder, carbon black powder (hereinafter referred to as "CB") with a BET specific surface area of 62 m$^2$/g as the conductive agent, and carboxymethyl cellulose (hereinafter referred to as "CMC") and styrene butadiene copolymer latex (hereinafter referred to as "SBR") as the binder resin were mixed in a solid content mass ratio of CB:CMC:SBR=0.3:1.0:2.0. The resulting mixture was added to the ion-exchanged water and the mixture containing the ion-exchanged water was stirred. This provided a slurry having these materials uniformly dispersed in water. The slurry was applied onto a 10-µm-thick copper foil to serve as a negative electrode current collector. Next, the electrode was heated for 10 minutes at 125° C. to vaporize water. Thus, the negative electrode active material layer was formed. The negative electrode active material layer was pressed to manufacture the negative electrode having the negative electrode active material layer applied onto one surface of the negative electrode current collector.

<Manufacture of Positive Electrode: Examples 1 to 3, Comparative Examples 1 to 6 and 8>

Lithium carbonate (Li$_2$CO$_3$), nickel hydroxide (Ni(OH)$_2$), cobalt hydroxide (Co(OH)$_2$), and manganese hydroxide (Mn(OH)$_2$) were mixed at a predetermined molar ratio so that the total amount of LiOH and Li$_2$CO$_3$ after the burning became 1.0 wt % or less. The resulting mixture was burned for 20 hours at 750° C. in the dry atmosphere. This lithium nickel composite oxide was pulverized, so that lithium nickel composite oxide (nickel cobalt lithium manganate (NCM523, nickel:cobalt:manganese=5:2:3, lithium/metal ratio=1.04, a BET specific surface area 22 m$^2$/g)) with an average particle diameter of 9 µm was obtained.

A mixed oxide formed by mixing the lithium nickel composite oxide thus obtained and a lithium manganese oxide (LiMn$_2$O$_4$) at 70:30 (weight ratio), CB which has a BET specific surface area of 62 m$^2$/g, carbon black powder (GR) which has a BET specific surface area of 22 m$^2$/g as the conductive agent, and polyvinylidene fluoride (PVDF) as the binder resin were added to N-methylpyrrolidone as a solvent (hereinafter referred to "NMP") at CB:GR:PVDF=3: 1:3 in a solid content mass ratio. In addition, oxalic anhydride (molecular weight: 90) as an organic moisture scavenger was added to this mixture by 0.03 parts by mass relative to 100 parts by mass of the solid content of the mixture excluding the NMP. The mixture including oxalic anhydride was planetary mixed and dispersed for 30 minutes to prepare a slurry having these materials dispersed uniformly. The slurry was applied onto a 20-µm-thick aluminum foil as a positive electrode current collector. Next, the electrode was heated for 10 minutes at 125° C., thereby vaporizing NMP. Thus, the positive electrode active material layer was formed. In addition, the positive electrode active material layer was pressed, thereby forming the positive electrode with the positive electrode active material layer applied on one surface of the positive electrode current collector.

<Manufacture of Positive Electrode: Example 4 and Comparative Example 7>

A positive electrode containing less alkaline component than the positive electrode in Example 1, etc. was manufactured. That is to say, the positive electrode was manufactured through the same procedure as Example 1, etc. except that the molar ratio of lithium carbonate (Li$_2$CO$_3$), nickel hydroxide (Ni(OH)$_2$), cobalt hydroxide (Co(OH)$_2$), and manganese hydroxide (Mn(OH)$_2$) was adjusted so that the total amount of LiOH and Li$_2$CO$_3$ after the burning was reduced to 0.05 wt % or less, and the burning condition to form the positive electrode active material was changed.

<Separator>

A ceramic separator including a heat-resistant microparticle layer including alumina as the heat-resistant microparticle and an olefin resin layer including polypropylene with a thickness of 25 µm was used.

<Electrolyte Solution>

For preparing the nonaqueous electrolyte solution, ethylene carbonate (hereinafter referred to as "EC"), diethyl carbonate (hereinafter referred to as "DEC"), and ethyl methyl carbonate (hereinafter referred to as "EMC") were mixed at EC:DEC:EMC=30:60:10 (volume ratio). To this nonaqueous solvent, lithium hexafluorophosphate (LiPF$_6$) as the electrolyte salt was dissolved at a concentration of 0.9 mol/L. To the obtained electrolyte solution, cyclic disulfonate (methylene methanedisulfonate (MMDS)) and vinylene carbonate (VC) as the additives were dissolved. This electrolyte solution containing the additives was used as the electrolyte solution.

<Manufacture of Lithium Ion Secondary Battery>

A rectangle with a predetermined size was cut out of each of the negative electrode and the positive electrode manufactured as above. In a portion thereof on which coating was not applied for connecting the terminal, a positive electrode lead terminal made of aluminum was welded with ultrasonic waves. Similarly, a negative electrode lead terminal made of nickel with the same size as the positive electrode lead terminal was welded with ultrasonic waves to a portion of the negative electrode plate on which coating was not applied. The negative electrode plate and the positive electrode plate were disposed on both surfaces of the porous polypropylene separator in a state that the active material layers are stacked with the separator interposed therebetween; thus, the electrode plate stack was obtained. Except one long side of the two aluminum laminate films, the other three sides were attached through heat-sealing. Thus, a bag-shaped package was manufactured. Into the bag-shaped package, the electrode stack was inserted. Next, the electrode stack was vacuum impregnated with the electrolyte solution poured into the package. Then, the opening was heat-sealed under reduced pressure. Thus, a stacked lithium ion battery was obtained. The stacked lithium ion battery was used to perform high-temperature aging a plurality of times and thus a stacked lithium ion battery with a battery capacity of 5 Ah was obtained.

<Initial Charging and Discharging>

The constant-current constant-voltage charging was performed at a current of 1 C with an upper voltage of 4.15 V under an atmosphere temperature of 25° C. until the residual battery (hereinafter referred to as "SOC", state of charge) became 100% from 0%. Next, the constant-current discharging was performed at a current of 1 C until the SOC became 0%.

<Measurement of Remaining Amount of Additive VC>

The lithium ion secondary battery after the initial charging and discharging was disassembled, and the amount of each additive remaining in the electrolyte solution of the battery was measured based on nuclear magnetic resonance (NMR). Table 1 shows the molar ratio of VC relative to the total mole number of additives.

<Measurement of Content Amount of Alkaline Component>

The amount of alkaline component in the positive electrode active material was measured based on a titration method.

<Measurement of Amount of Moisture>

The amount of moisture in the positive electrode active material was measured based on a Karl Fischer method.

sured based on JIS Z 8807 "methods of measuring density and specific gravity of solid—measuring method by weighing in liquid".

<Preservation Characteristic Test>

After the amount of each additive remaining in the electrolyte solution was measured, the package of the battery was sealed again through the aforementioned procedure. The manufactured battery was charged at constant current and constant voltage at a current of 1 C with an upper-limit voltage of 4.15 V until an SOC of 100% was attained. After that, the battery was preserved in a thermostat tank with a temperature of 45° C.; thus, the preservation test was carried out. The discharge capacity and the DC resistance before and after the preservation were measured. From the measurement values, the 1-C discharge capacity retention and the cell DC resistance increase rate were calculated.

<Measurement of Amount of Generated Gas>

The volume of the battery after the initial charging and discharging and the volume of the battery after the preservation test were measured based on JIS Z 8807 "methods of measuring density and specific gravity of solid—measuring method by weighing in liquid". In the preservation test, the battery with an SOC of 100% was preserved at 45° C. for 20 weeks. The amount of generated gas was calculated by the formula:

The amount of generated gas=(volume of battery after the preservation test)−(volume of battery after the initial charging and discharging)

TABLE 1

| | | Battery | | | | | | | |
|---|---|---|---|---|---|---|---|---|---|
| | VC molar ratio (%) | Amount of LiOH per weight of positive electrode active material layer (%) | Amount of Li$_2$CO$_3$ per weight of positive electrode active material layer (%) | Amount of LiOH per lithium nickel composite oxide (%) | Amount of Li$_2$CO$_3$ per lithium nickel composite oxide (%) | Amount of moisture per lithium nickel composite oxide (%) | Amount of generated gas (CC) | Discharge capacity retention (%) | Battery resistance increase rate (%) |
| Example 1 | 70.5 | 0.053 | 0.058 | 0.08 | 0.08 | 390 | 3.6 | 90.7 | 11 |
| Example 2 | 62.2 | 0.053 | 0.058 | 0.08 | 0.08 | 385 | 0.1 | 90.2 | 14 |
| Example 3 | 46.0 | 0.054 | 0.060 | 0.08 | 0.09 | 384 | 0.1 | 91.5 | 10 |
| Example 4 | 44.1 | 0.005 | 0.050 | 0.02 | 0.20 | 295 | 0.0 | 93.5 | 0 |
| Comparative Example 1 | 81.2 | 0.053 | 0.058 | 0.08 | 0.08 | 375 | 3.9 | 86.0 | 21 |
| Comparative Example 2 | 87.7 | 0.055 | 0.058 | 0.08 | 0.08 | 384 | 4.2 | 85.4 | 23 |
| Comparative Example 3 | 93.5 | 0.052 | 0.054 | 0.07 | 0.08 | 388 | 4.7 | 84.8 | 25 |
| Comparative Example 4 | 81.3 | 1.022 | 0.057 | 1.46 | 0.08 | 380 | 8.9 | 84.5 | 38 |
| Comparative Example 5 | 81.1 | 0.053 | 1.050 | 0.08 | 1.50 | 370 | 10.5 | 82.8 | 44 |
| Comparative Example 6 | 81.5 | 0.105 | 0.112 | 0.15 | 0.16 | 900 | 20.2 | 82.6 | 56 |
| Comparative Example 7 | 79.7 | 0.003 | 0.030 | 0.02 | 0.19 | 300 | 4.2 | 91.8 | 2 |
| Comparative Example 8 | 62.2 | 1.018 | 0.060 | — | — | 383 | 6.3 | 85.2 | 27 |

<Resistance of Battery>

For measuring the resistance of the battery, the battery with a residual battery (state of battery, SOC) of 50% was prepared. The constant-current discharging at 10 A was performed for 10 seconds at 25° C. By measuring the voltage at the end of the discharge, the resistance of the battery was obtained. The volume of the battery was mea- The generation of the gas derived from the oxidative decomposition of the additives in the electrolyte solution was substantially suppressed by maintaining the proportion of VC in the additives in the electrolyte solution to be small and reducing the amount of alkaline component remaining in the positive electrode active material (Examples 1 to 4). These batteries have the high discharge capacity retention even after the preservation test, and the increase rate of the resistance of the batteries is small. That is to say, by considering the balance between the proportion of each additive and the amount of alkaline component remaining in the positive electrode active material, the amount of generated gas derived from the electrolyte solution can be suppressed and the lifetime of the battery can be improved. Such effects are considered to be based on the following mechanism: the oxidative decomposition reaction of the product generated at the interface of the positive electrode is suppressed by adjusting the amount of each additive and the amount of alkaline component remaining in the positive electrode active material within a predetermined range; and the oxidative decomposition reaction and the chemical decomposition reaction of the cyclic carbonate such as VC, which would accelerate if there were alkaline and water, are effectively suppressed. Moreover, another thought is that the amount of gas generated from the remaining alkaline component and the additive is remarkably reduced while the high discharge capacity retention and the small increase rate of the battery resistance are secured. In particular, in Examples 2 to 4, the remaining alkaline component is just the same as that of other Examples and Comparative Examples. However, although the additive VC still remains, the amount of generated gas is substantially "0 CC". This fact indicates that the effect of the present disclosure is remarkable.

Examples of the embodiment have been described so far but Examples merely represent some examples of the embodiment of the present disclosure. The description of Examples made above is not intended to limit the technical range according to the present disclosure to the particular embodiment or specific structure.

The lithium ion secondary battery according to the embodiment of the present disclosure may be any of the following first to seventh lithium ion secondary batteries.

The first lithium ion secondary battery is a lithium ion secondary battery including a power generating element in a package, the power generating element including: a positive electrode having a positive electrode active material layer disposed on a positive electrode current collector; a negative electrode having a negative electrode active material layer disposed on a negative electrode current collector; a separator; and an electrolyte solution, wherein: the positive electrode active material layer includes a lithium nickel composite oxide as a positive electrode active material; the positive electrode contains an alkaline component by less than 1% relative to the weight of the positive electrode active material; the electrolyte solution includes an additive; and the molar ratio of a cyclic carbonate additive with an unsaturated bond is 78% or less when the total molar amount of the additive is 100.

The second lithium ion secondary battery is the first lithium ion secondary battery, in which the molar ratio of the cyclic carbonate additive with an unsaturated bond in the electrolyte solution is 63% or less when the total molar amount of the additive is 100.

The third lithium ion secondary battery is the first or second lithium ion secondary battery, in which the alkaline component is contained by 0.2% or less relative to the weight of the positive electrode active material.

The fourth lithium ion secondary battery is any of the first to third lithium ion secondary batteries, in which the cyclic carbonate additive with an unsaturated bond is vinylene carbonate.

The fifth lithium ion secondary battery is any of the first to fourth lithium ion secondary batteries, in which the positive electrode active material layer includes as the positive electrode active material, a lithium nickel manganese cobalt composite oxide which is represented by general formula $Li_xNi_yCo_zMn_{(1-y-z)}O_2$ and has a layered crystal structure.

The sixth lithium ion secondary battery is any of the first to fifth lithium ion secondary batteries, in which the positive electrode contains water by 400 ppm or less relative to the weight of the lithium nickel composite oxide as the positive electrode active material.

The seventh lithium ion secondary battery is any of the first to sixth lithium ion secondary batteries, in which the additive contains methylene methanedisulfonate.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A lithium ion secondary battery comprising:
    a positive electrode having a positive electrode active material layer disposed on a positive electrode current collector;
    a negative electrode having a negative electrode active material layer disposed on a negative electrode current collector; and
    an electrolyte solution,
    wherein the positive electrode active material layer includes a positive electrode active material containing a lithium nickel composite oxide,
    wherein the positive electrode contains a remaining alkaline component by 0.16% to 0.22% relative to a weight of the positive electrode active material,
    wherein the electrolyte solution comprises additives consisting of methylene methane disulfonate and vinylene carbonate,
    wherein a molar ratio of the vinylene carbonate relative to a total molar amount of the additive is between 44.1% and 62.2% after an initial charging and discharging of the lithium secondary battery, and
    wherein the positive electrode contains water in a range of 295 ppm to 385 ppm relative to a weight of the lithium nickel composite oxide.

2. The lithium ion secondary battery according to claim 1, wherein the lithium nickel composite oxide is a lithium nickel manganese cobalt composite oxide which is represented by general formula $Li_xNi_yCo_zMn_{(1-y-z)}O_2$ and has a layered crystal structure (where "x" is a numeral satisfying $1 \leq x \leq 1.2$, "y" and "z" are positive numerals satisfying $y+z<1$, and "y" is a numeral of 0.5 or less).

3. The lithium ion secondary battery according to claim 1, wherein the positive electrode active material further comprises oxalic anhydride.

4. A lithium ion secondary battery comprising:
    a positive electrode having a positive electrode active material layer disposed on a positive electrode current collector;
    a negative electrode having a negative electrode active material layer disposed on a negative electrode current collector; and an electrolyte solution, wherein the positive electrode active material layer includes a positive electrode active material containing a lithium nickel composite oxide, wherein the positive electrode contains a remaining alkaline component by 0.16% to 0.22% relative to a weight of the positive electrode active material, wherein the electrolyte solution comprises additives consisting of methylene methane disulfonate and vinylene carbonate, wherein a molar ratio of the vinylene carbonate relative to a total molar amount of the additive is between 62.2% and 70.5% after an initial charging and discharging of the lithium secondary battery, and wherein the positive electrode contains water in a range of 295 ppm to 385 ppm relative to a weight of the lithium nickel composite oxide.

5. The lithium ion secondary battery according to claim 4, wherein the lithium nickel composite oxide is a lithium nickel manganese cobalt composite oxide which is represented by general formula $Li_xNi_yCo_zMn_{(1-y-z)}O_2$ and has a layered crystal structure (where "x" is a numeral satisfying 1≤x≤1.2, "y" and "z" are positive numerals satisfying y+z<1, and "y" is a numeral of 0.5 or less).

6. The lithium ion secondary battery according to claim 4, wherein the positive electrode active material further comprises oxalic anhydride.

7. A lithium ion secondary battery comprising:

a positive electrode having a positive electrode active material layer disposed on a positive electrode current collector;

a negative electrode having a negative electrode active material layer disposed on a negative electrode current collector; and an electrolyte solution comprising both diethyl carbonate and ethyl methyl carbonate, wherein the positive electrode active material layer includes a positive electrode active material containing a lithium nickel composite oxide, wherein the positive electrode contains a remaining alkaline component by 0.16% to 0.22% relative to a weight of the positive electrode active material, wherein the electrolyte solution comprises additives consisting of methylene methane disulfonate and vinylene carbonate, wherein a molar ratio of the vinylene carbonate relative to a total molar amount of the additive is between 44.1% and 62.2% after an initial charging and discharging of the lithium secondary battery, and wherein the positive electrode contains water in a range of 295 ppm to 385 ppm relative to a weight of the lithium nickel composite oxide.

8. The lithium ion secondary battery according to claim 7, wherein the lithium nickel composite oxide is a lithium nickel manganese cobalt composite oxide which is represented by general formula $Li_xNi_yCo_zMn_{(1-y-z)}O_2$ and has a layered crystal structure (where "x" is a numeral satisfying 1≤x≤1.2, "y" and "z" are positive numerals satisfying y+z<1, and "y" is a numeral of 0.5 or less).

9. The lithium ion secondary battery according to claim 7, wherein the positive electrode active material further comprises oxalic anhydride.

* * * * *